United States Patent [19]

Regan et al.

[11] 4,267,593

[45] May 12, 1981

[54] METHOD AND MEANS FOR DIGITAL CONFERENCING

[75] Inventors: John F. Regan, Lombard; Bakulesh A. Mehta, Bollingbrook, both of Ill.

[73] Assignee: Wescom Switching, Inc., Downers Grove, Ill.

[21] Appl. No.: 48,830

[22] Filed: Jun. 15, 1979

[51] Int. Cl.³ .............................................. H04M 3/56
[52] U.S. Cl. .................................................. 370/62
[58] Field of Search ....................... 179/18 BC, 1 CN; 370/62

[56] References Cited

U.S. PATENT DOCUMENTS

| | | | |
|---|---|---|---|
| 3,699,264 | 10/1972 | Pitroda et al. | 179/18 BC |
| 3,958,084 | 5/1976 | Nicholas | 179/1 CN |
| 3,967,070 | 6/1976 | Srivastava et al. | 179/15 AT |
| 4,022,981 | 5/1977 | McLaughlin et al. | 179/18 BC |
| 4,031,328 | 6/1977 | Pitroda | 179/18 BC |
| 4,054,755 | 10/1977 | Lee et al. | 179/18 BC X |
| 4,126,766 | 11/1978 | McLaughlin et al. | 179/18 BC |

Primary Examiner—Thomas W. Brown
Attorney, Agent, or Firm—Leydig, Voit, Osann, Mayer & Holt, Ltd.

[57] ABSTRACT

A digital conferencing arrangement for use in a digital telecommunications switching system. Digital coded signals representative of sampled analog signals are compared and the results of the comparison noted to identify the present speaker in the conference. A comparison result indicating a proposed new speaker initiates a delay interval during which subsequent samples are compared to assure that the proposed new speaker indeed has the largest analog signal during the delay window. Upon verification of the proposed new speaker, the control of the conference circuit is transferred to him.

8 Claims, 4 Drawing Figures

METHOD AND MEANS FOR DIGITAL CONFERENCING

This invention relates to telephony and more particularly to a digital conference circuit for use in a telephone switching system.

Perhaps the most common type of connection encountered in telephony is between two stations (such as two subscribers). In such a case, the network establishes a path for bidirectional communication between the two parties so that each may talk or listen as desired. Many occasions arise when it is desirable to connect more than two parties for communication. For example, 5, 6 or more people may desire to discuss the same subject at the same time and thus require a multi-port conference. An even more common situation exists in private automatic branch exchanges PABX where the attendant is frequently a party in a normal two-port connection.

In switching systems where the voice signals remain in analog form, conferencing is not an overly difficult proposition. Various forms of conference bridges and the like have been devised which add the voice samples of all participants and transmit the sum to the conference participants.

A different array of problems arise in the more current generation of digital switching systems, especially those utilizing PCM or other non-linear digital codes. Taking the PCM switching system as an example, the signals switched are non-linear digital codes representing amplitudes of the original analog voice signals sampled at predetermined intervals. Typically, voice signals are sampled at an 8 kHz rate, and each sample digitized into an 8 bit non-linear code. It is not possible to apply directly the concept of the analog conference circuit which simply adds samples from all participants because the non-linear nature of the digital codes precludes such direct addition.

To overcome the problem, a digital conference scheme has been proposed using the instant speaker algorithm, such approach being described in Pitroda et al. U.S. Pat. No. 3,699,264, entitled Conference Circuit For Pulse Code Modulated Telephony. In that system, the codes of all conference participants in a given frame are compared and an instantaneous decision made based on the largest sample, identifying the orginator of that sample as the instant speaker. His sample during the next frame is then sent to all other parties to the conference while an additional instantaneous decision is made to control switching during the next frame.

While the instant speaker algorithm can be implemented in a digital conference circuit, it has certain inherent drawbacks which manifest themselves as signal distortion including voice breakup and transhybrid loss distortion.

The present invention is based on a realization of the nature of the basic digital conferencing problem and the inherent inability of the instant speaker algorithm to address it. More particularly, the instant speaker algorithm is just that—instantaneous. No account is taken of the nature of the analog signals which produced the samples.

In view of the foregoing, it is an aim of the present invention to provide a method and means for digital conferencing which takes into account the nature of the waveform which produces the instantaneously compared samples. More specifically, it is an object of the invention to initiate a decision window upon detection of a proposed new speaker, and to verify the validity of the new speaker during the decision window before switching control of the conference circuit to him. A more detailed object in that regard is to provide such a window to allow subsequent sample comparisons to identify the channel producing the largest analog signal during the window.

Stated generally, an object of the invention is to provide a method and means for digital conferencing which has higher transmission quality than provided by the instant speaker algorithm used heretofore.

Other objects and advantages will become apparent from the following detailed description, taken in conjunction with the drawings, in which.

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Figure 1:
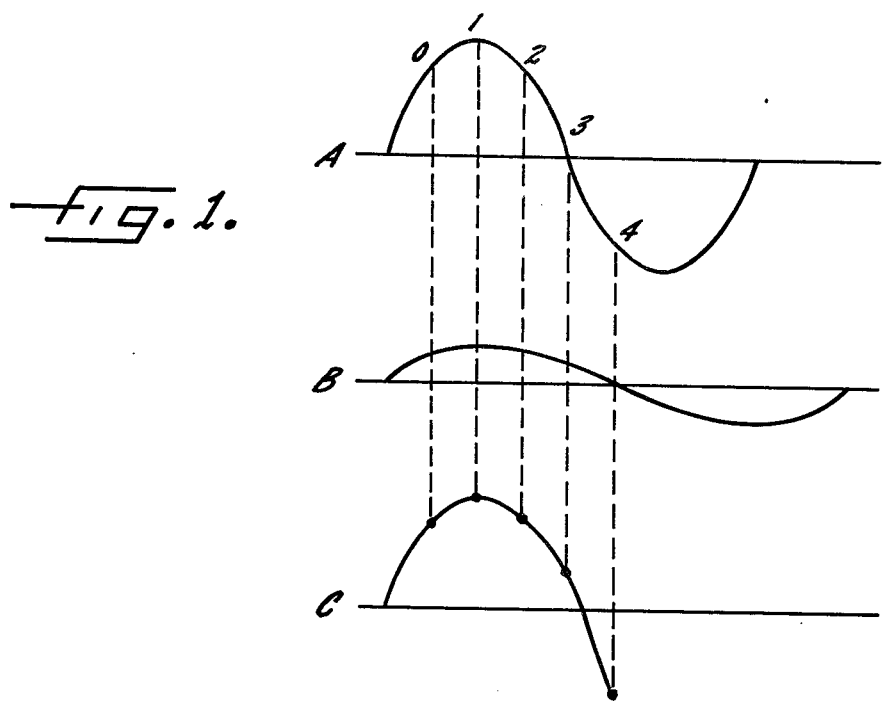
FIG. 1 is a waveform diagram illustrating analog signals and sample comparison.

Turning now to the drawing, FIG. 1 shows a pair analog waveforms originating from parties A and B intending to engage in a conference with a third party listener (not shown). It is apparent from viewing the drawing that party A has the largest amplitude signal and should be in control of the conference.

The vertical lines 0-4 illustrate the points at which the signals would be sampled in a PCM switching system. Utilizing the aforementioned instant speaker algorithm, the conference circuit would base its determination of present speaker solely on comparison of the pairs of samples. Accordingly, at points 0, 1 and 2 party A would control the conference. However, at point 3 party A's analog signal goes through a zero crossing. At that instant of sampling, even though the overall waveform of party A is larger in magnitude, the party B sample would be identified as the present speaker. Accordingly, B's signal would be sent out as a result of the sample comparisons made at instant 3.

Waveform C shows the composite signal transmitted and illustrates that at point 3 a signal component not present in the original waveform is introduced into the transmitted waveform as distortion.

Of further consequence is the fact that an unnecessary switch between the parties has occurred due to the instantaneous nature of the algorithm. More specifically, it is apparent that the instant speaker algorithm produces unnecessary and therefore excessive switching between speakers resulting in voice breakup. The resulting audio quality is noticably deficient.

In order to overcome the difficulties of voice breakup due to frequent switching between speakers, attempts have been made to introduce a threshold and prevent switching between speakers when the signal samples are below such threshold. This approach presents its own array of problems. While it does reduce switching between speakers, it creates a situation where low level speakers have difficulty in seizing control of the conference circuit. That is especially troublesome when conferencing between lines and trunks in systems where the trunk audio level is substantially below that of the subscriber lines.

Figure 2:
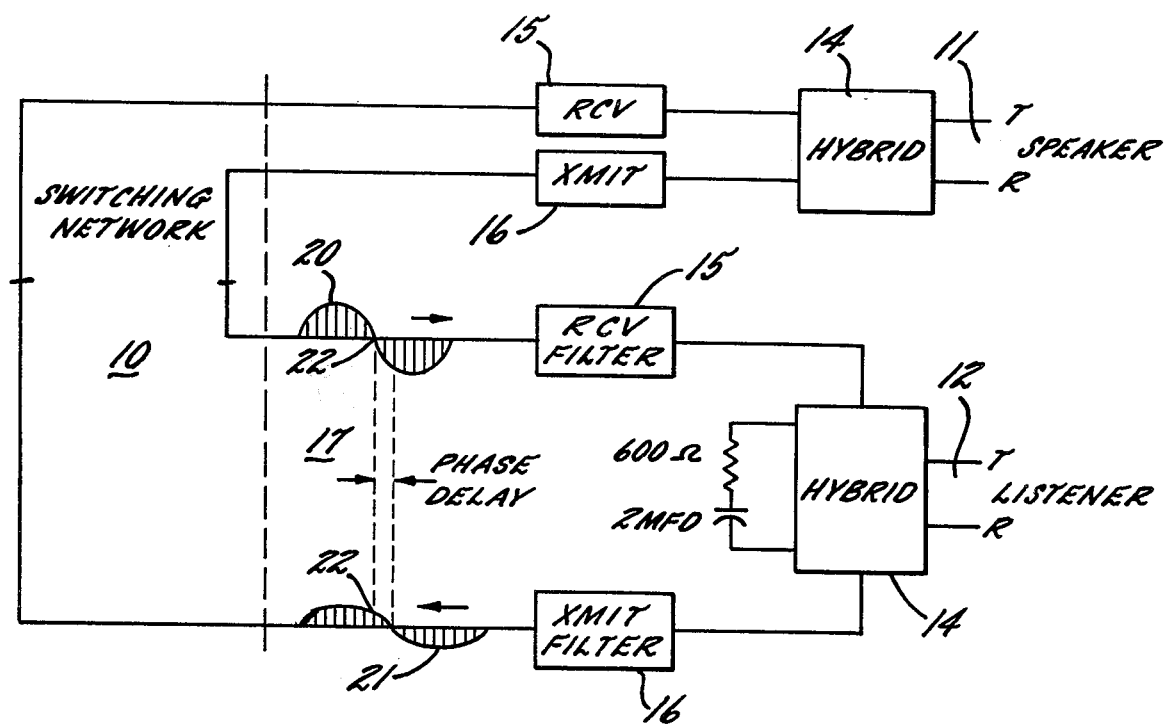
FIG. 2 is a circuit diagram illustrating the transhybrid loss problem.

FIG. 2 schematically shows a switching system and is intended to illustrate the problems caused by transhybrid loss utilizing the instant speaker algorithm. The system includes a digital switching network 10 and a plurality of subscribers including subscribers 11, 12. In the illustrated embodiment, the conference circuit is located within the switching network 10. As is conventional, the analog signal of each speaker is passed through a hybrid 14 which in turn is connected to receive and transmit filters 15, 16. As illustrated generally at 17, the signals are sampled and digitized before being passed to or from the switching network 10.

Hybrid 14 is shown with a standard balance network comprising a resistor of 600 ohms in series with a 2 microfarad capacitor. Because that balance network cannot accurately match the impedance characteristics of the subscriber line across the frequency range, the hybrid will not exhibit infinite loss, and part of the signal imposed on the transmit port will be reflected from the receive port. In the illustrated example, the subscriber 11 is speaking and generating a waveform shown at 20. Because the balance of hybrid 14 is not perfect, the signal 21 is reflected back into the switching system. The signal 21 is of lesser amplitude and out of phase with the original signal 20. Because of the phase delay, at the zero crossings of the original signal 20 illustrated at point 22, the sample of the reflected signal 21 will be greater in magnitude than the zero sample of the originating signal. As the conference circuit within the switching network 10 is comparing samples, a point will be reached where the samples at point 22 are being compared. Even though the signal 20 is larger overall, and even though the signal 22 is simply reflection and should not be in the system at all, the conference circuit will switch control to the signal 22 just as if the listener 12 were speaking.

As noted previously, thresholds can be utilized to minimize this type of switching; however, such thresholds introduce the problems noted above.

The present invention is based in part upon a realization of the problems noted above and in further part upon provision of means for utilizing comparison of instantaneous samples over a predetermined decision making interval in order to assure that control of the conference remains with the party having the largest analog waveform. The resulting conference circuit operates to compare instantaneous samples of signals as is conventional. However, once a sample comparison indicates that a party other than the present speaker has the largest amplitude sample, means are provided for opening a decision window and continuing to monitor results of the sampling while such window is open. During the time the decision window is open if it is determined that the proposed new speaker indeed has the largest value analog waveform, control of the conference circuit is switched to the new speaker. However, while the decision window is open, if it is found that the previous present speaker has the largest overall waveform (such as if the event which caused the opening of the decision window was a zero crossing of the largest signal), then control of the conference is left with the original present speaker. As a result, frequent switching between parties is eliminated as is the need to impose a comparison threshold. It becomes easier for low level talkers to seize control of the conference and voice break up problems are substantially reduced.

Preferably the length of the decision window is set in accordance with the frequency of signals being passed by the system. We prefer to set the decision window at a maximum of 3 milliseconds which represents approximately one half cycle of a 200 Hz signal. Leaving the decision window open for that length of time allows even the lowest frequency signal to pass from a zero crossing to a peak before the window is closed. As a result, if a low frequency but loud talker passes through a zero crossing, and a noise, echo or the like sample surpasses his zero value sample, the decision window allows sufficient time for the higher amplitude signal to reach a peak and reassert control, thereby preventing switching of the conference circuit.

Figure 3:
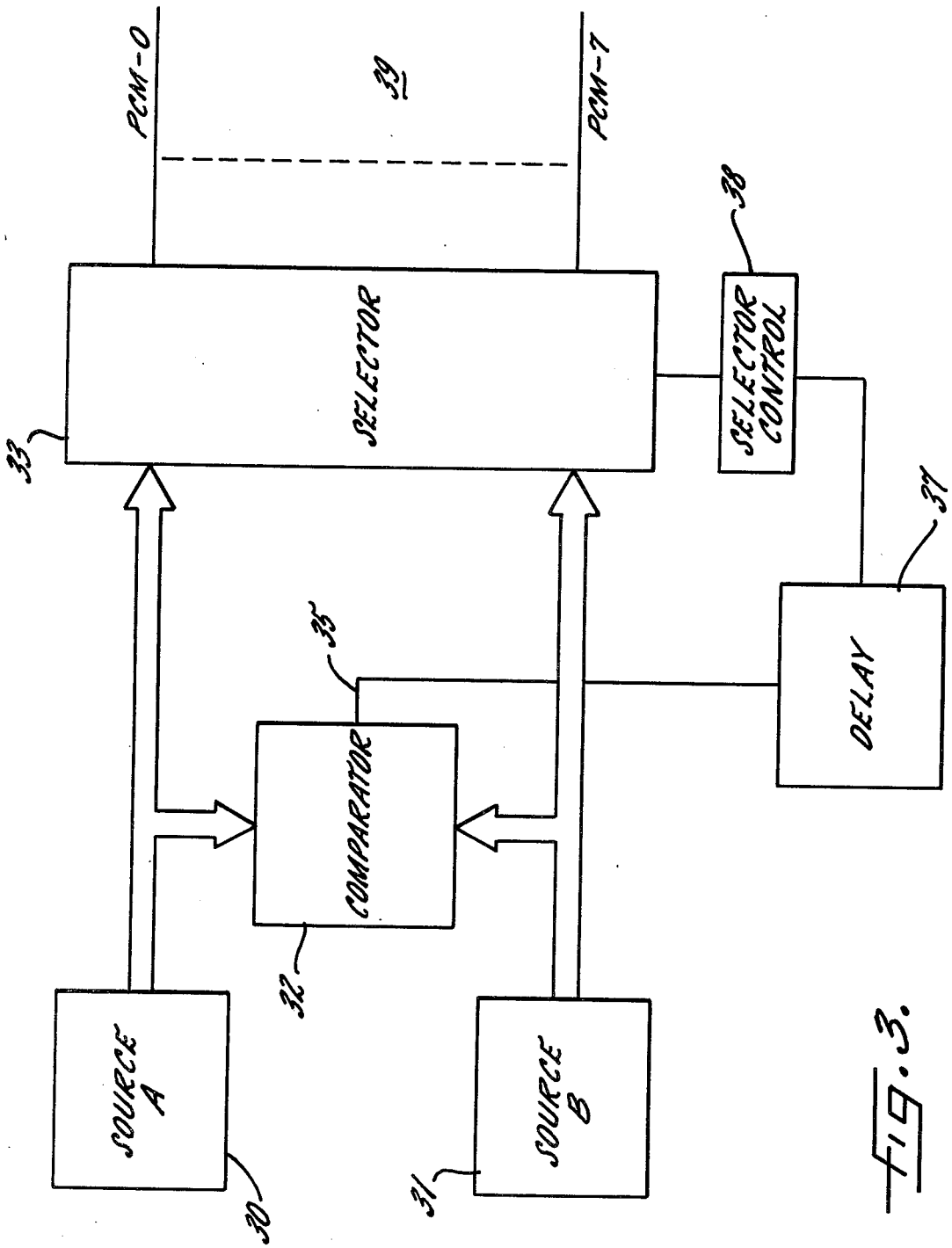
FIG. 3 is a block diagram illustrating an embdiment of the present invention.

Turning to FIG. 3 there is shown in block diagram form details of a conference circuit embodying our invention. To illustrate the general applicability of the system, the PCM signals are shown as emanating from a pair of sources A and B, such sources being designated 30, 31. In a multiport conference, the sources 30, 31 are typically a pair of registers for temporarily storing PCM words. By way of contrast, in a 3 port conference which takes place in the network itself, the sources 30, 31 represent the A and B connection memories.

The parallel PCM words emanating from the sources 30, 31 are imposed on a comparator 32 and also on a selector or 2 to 1 multiplexer 33. A selector control 38 operates the selector 33 and typically includes means for identifying or remembering the identity of the present speaker. The comparator 33 makes an instantaneous decision indicating whether sample A or sample B is larger and outputs a binary signal on line 35 indicating the result of the comparison. Rather than conventionally controlling the selector control 38 via the line 35, delay means 37 are provided for introducing the aforementioned decision window. The output of the delay means acts through the selector control 38 to cause the selector 33 to pass the signal from either source A or source B to the output PCM bus 39. The delay means 37 is a logic element comprising a counter or memory which monitors the results of the comparisons performed by comparator 32 during the time the decision window is open. Based on the results of such comparisons, the delay means 37 determines whether the signal from source A or source B is larger during the interval of the decision window, and produces an output which acts upon the selector control 38 to assure that the selector 33 passes the largest signal. If the comparator 35 detects a proposed new speaker different than the present speaker, the delay means 37 will transfer control to the proposed new speaker only if it determines that the proposed new speaker has the largest overall signal during the delay interval.

Figure 4:
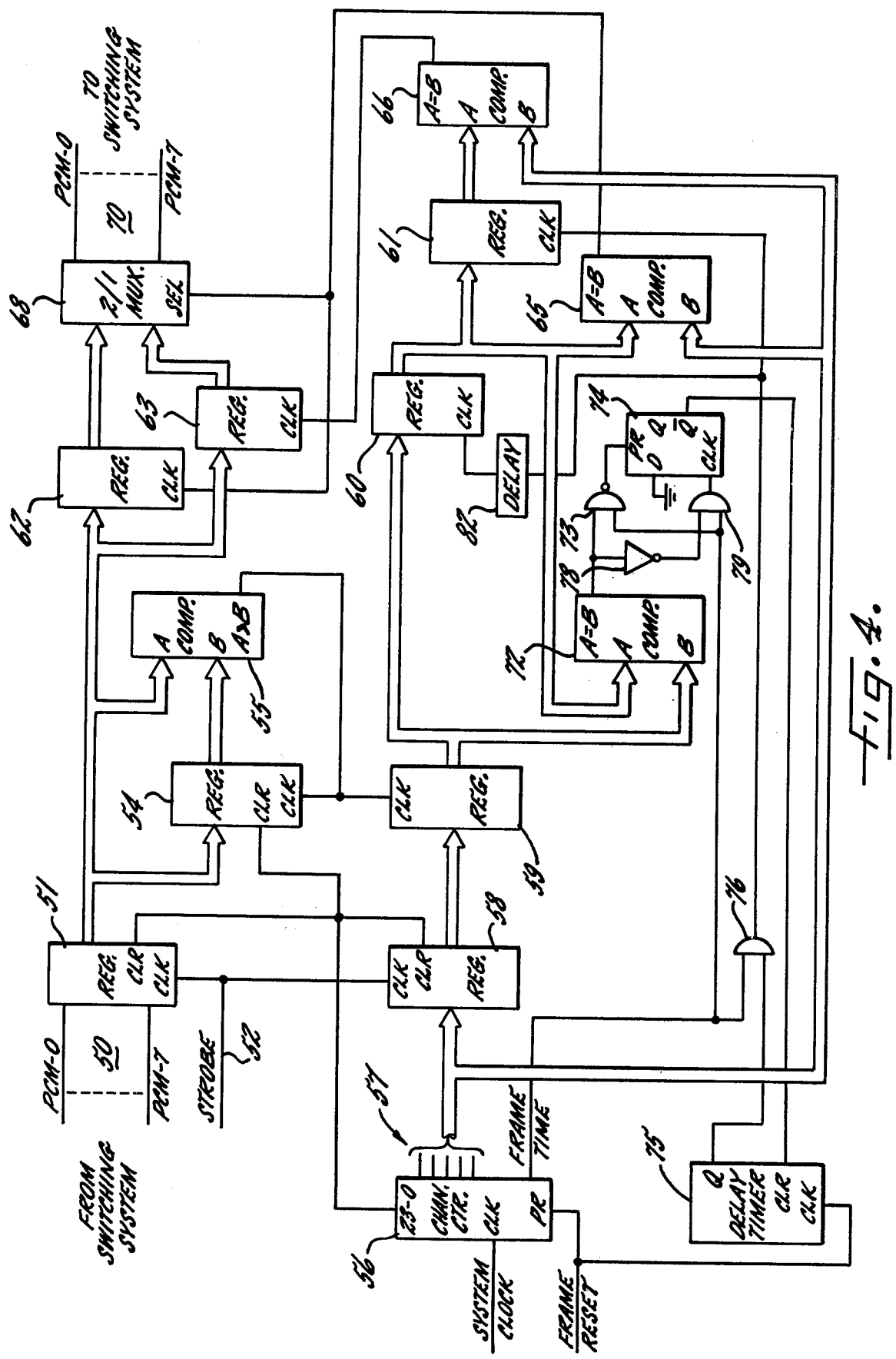
FIG. 4 is a circuit diagram illustrating a more detailed embodiment of the present invention.

Turning now to FIG. 4, there is shown a more detailed circuit diagram of an embodiment of a conference circuit according to the present invention. The present embodiment is intended for use as a multi-port conference circuit capable of handling up to 24 conferees. It is preferably located in the switching system at the low level end in the place normally occupied by an analog to digital to analog converter. As such, the system receives PCM samples from the network, makes a comparison to determine the present speaker and routes samples back to the network based on that comparison for switching to the conferees.

Incoming PCM samples are shown at 50 and are applied as parallel inputs to a register 51. The register is clocked by a strobe signal 52 timed with the appearance of the PCM samples, such that each parallel sample is loaded in turn into the register 51. The parallel PCM outputs of the register 51 are presented as inputs to a second register 54. The clock input of the register 54 is controlled by a comparator 55 which receives as inputs the PCM samples from the registers 51, 54. The registers 51, 54 are cleared just before the start of each frame by a channel counter 56, particularly by a signal identified as 23–0 indicating that such signal is active at a time between the final 23rd channel and the initial channel 0. As a result, when the first PCM sample is presented to the register 51 it is clocked thereinto. That signal is compared against the zero value held in register 54 such that the comparator 55 determines that the signal in register 51 is larger and clocks it into the register 54. All subsequent samples are loaded into register 51, but only those which are larger in magnitude than that stored in register 54 are clocked into register 54. As a result, at the end of the frame the register 54 holds the largest sample presented during that frame.

Digressing for a moment to the channel counter 56, it is seen that a system clock input is applied to clock the counter such that its binary outputs 57 contain the binary channel address of the sample then being presented to the register 51. A pair of address registers 58, 59 are associated with the respective data registers 51, 54. The register 58 is clocked by the same signal which clocks the register 51, such that the register 58 always contains the address of the samples stored in the register 51. Similarly, the register 59 is clocked by the same signal which clocks the register 54, such that the register 59 always contains the address of the largest sample for a frame at the end of a frame.

In a manner to be described below a pair of further address registers 60, 61 are clocked to receive the contents of register 59 such that the register 60 always contains the address of the present speaker and the register 61 always contains the address of the previous present speaker. The registers 60, 61 are associated with a pair of PCM registers 62, 63 respectively. Means are provided for loading the PCM data at the address stored in register 60 into the register 62 such that the register 62 contains the current sample from the present speaker. Similarly, means are provided for clocking the current PCM word from the previous speaker into the register 63 at the address stored in the register 61. More specifically, it is seen that a comparator 65 compares the address in the register 60 against the address currently being produced by the channel counter 56 to produce a clocking output signal passed to the register 62 for loading PCM data of the present speaker into the register 62. A similar comparator 66 compares the contents of the register 61 with the current output of the channel counter 56. The output of the comparator 66 serves to clock the PCM data from the register 51 into the register 63 during the time slot of the previous present speaker at the address stored in the register 61.

As a result, the information in the registers 62, 63 comprises all of the data which need be clocked out of the conference circuit for return to the conferees. A 2 to 1 multiplexer 68 receives the outputs of the register 62, 63 and passes one or the other of such outputs onto the outgoing PCM bus 70. Which of the outputs it passes is controlled by a select input connected to the output of the comparator 65. It is recalled that the comparator 65 output signal is active during the time slot of the present speaker. At that time, the select input causes the multiplexer 68 to pass the PCM samples stored in the previous present speaker register 63 onto the output bus 70. During all other time slots the select input causes the multiplexer 68 to pass the samples stored in the present speaker register 62 onto the output bus. As a result, all parties to the conference receive the sample of the present speaker with the exception of the present speaker who receives the sample from the previous present speaker.

In accordance with the invention, means are provided for monitoring the comparisons being made, for opening a decision window upon the detection of a proposed new speaker, and for continuing to monitor the comparisons during the window to assure the validity of the proposed new speaker before switching control of the conference. To that end, a comparator 72 is provided for comparing the address stored in the present speaker address register 60 against the address stored in the proposed new speaker register 59. It is recalled that at the end of every frame the register 59 holds the address of the time slot producing the largest sample during that frame. If that address is the same as the address of the present speaker, the comparator 72 produces a high output signal which is imposed on a NAND gate 73. The second input of the NAND gate 73 is produced by the channel counter and is identified as "frame time". That signal is active only during frame time, that is between the end of channel 23 and the start of a new channel 0. As a result, if the addresses in the registers 59, 60 match at the end of a frame indicating that the largest sample in that frame is that of the present speaker, the NAND gate 73 will be satisfied, imposing a preset signal on a flip-flop 74. The Q output of the flip-flop 74 is accordingly driven low, which low signal is imposed on the clear input of a delay timer 75, holding that timer in reset. The timer output acts through a NAND gate 76 which prevents clocking of the registers 60, 61, such that the addresses of the present speaker and previous present speaker used during the previous frame are retained. As a result, it is not possible to change the identity of either the present speaker or the previous present speaker while the counter 75 is in reset.

The manner in which the contents of registers 60, 61 are altered, and thus the identity of the present and previous present speakers updated will now be described. If at the end of a frame the contents of registers 59 and 60 are different, indicating that the largest sample during that frame was not from the present speaker, the output of the comparator 72 will be low. That low signal acting through NAND gate 73 removes the preset signal from the register 74. At the same time, the low signal acts through an inverter 78 and an AND gate 79 to clock flip-flop 74. Since the D input of the flip-flop 74 is tied to ground, the Q output will be clocked high, removing the clear from the delay timer 75. The clock input of the delay timer 75 is driven from the frame reset signal which also serves to preset the channel counter 56. Such signal is active at the end of each frame, such that the channel counter is cleared in preparation for counting channels in a new frame and such that the delay timer is incremented by 1. The modulus of the delay timer 75 is set such that it produces an output after approximately 3 milliseconds. The timer 75 continues to count frame reset pulses while maintaining its output low during the operation. As a result, while the timer 75 is counting, it is still not possible to update the contents of the registers 60, 61. However, if the delay timer 75 times out, the output thereof is driven high, partially satisfying the AND gate 76. At frame time the second input of AND gate 76 is driven high, satisfying that gate which serves to clock the register 61, loading the address of the present speaker into the previous present speaker register 61. After a brief delay introduced by delay circuit 82, the register 60 is clocked by the AND gate 76, loading the address then stored in register 59 into the present speaker register 60. As a result, the system has now identified a new present speaker, but only after the delay interval introduced by the timer 75.

If during the course of sample comparison during the delay interval, if the sample of the present speaker is largest for any frame, the address of the present speaker will be loaded into the register 59 by the comparator 55. At the end of that frame, the comparator 72 will determine that the addresses in the registers 59 and 60 are identical, indicating that the present speaker has produced a sample in excess of all others during the delay interval and therefore likely has the largest overall analog signal. The output of the comparator 72 will act through the NAND gate 73 to activate the present input of the flip-flop 74 and thus return the delay timer 75 to the reset state. The output of the delay timer 75 will thereupon be locked low, preventing the updating of the address registers 60 or 61.

To summarize operation, registers 60, 61 control the outputting of PCM samples. The present speaker address is stored in register 60 and the previous present speaker address is stored in register 61. The data of the present speaker loaded in register 62 is output to all conferees with the exception of the present speaker who receives data from the previous present speaker register 63. The addresses in the registers 60, 61 are updated only after a delay interval during which it is determined that indeed a proposed new speaker has an analog signal which exceeds in value that of the present speaker. If during the course of the delay window a frame occurs in which the sample of the present speaker exceeds that of all other conferees, the present speaker will retain control, the delay timer 75 will be reset and the system will continue with the present speaker in control. The cycle can be repeated at all zero crossings without the danger of switching between conferees unnecessarily and causing the resulting voice breakup.

It will be apparent that the invention also includes method aspects related to the provision of digital conferencing in a telecommunications switching system. More particularly, samples of all conferees are compared during a time frame and the largest sample identified. A determination is made as to whether the largest sample originated from the present speaker. If it did not, a delay interval is initiated and all further sample comparisons made during the delay interval monitored. If, during the course of the delay interval, it is determined that the present speaker has the largest signal, control is left with the present speaker. If, however, during the course of the delay interval it is determined that the proposed new speaker has the largest value signal, control of the conference is switched to the proposed new speaker.

We claim as our invention:

1. In a conference circuit for a digital telecommunications switching system having a comparator for comparing digital samples of conferees and producing an output signal identifying the largest sample, and means for identifying a present speaker and outputting his sample to the conferees during each frame, the improvement comprising, delay means for initiating a delay following detection of a proposed new speaker by said comparator having a sample larger than that of the present speaker, logic means responsive to the comparator and operative during the delay for determining if the proposed new speaker has the largest analog signal during the delay, and means responsive to a positive determination by said logic means and operative upon the identifying means for updating the identity of the present speaker to that of the proposed new speaker.

2. In a conference circuit for a digital telecommunications switching system having comparison means for comparing digital samples of conferees and producing an output signal identifying the largest sample, and means for identifying a present speaker and outputting his sample to the conferees during each frame, the improvement comprising, delay means for initiating a delay following detection of a proposed new speaker by said comparison means having a sample larger than that of the present speaker, monitoring means for monitoring the comparison results during the delay to determine if the proposed new speaker or the present speaker has the largest overall signal, and means for updating the identity of the present speaker to that of the proposed new speaker if the monitoring means determines the proposed new speaker has the largest overall signal during the delay.

3. The improvement as set forth in claim 2 wherein the delay means comprises identity comparison means for comparing the identities of the proposed new speaker and the present speaker, means responsive to the identity comparison means for initiating said delay when said identities are different, means operative upon the completion of said delay for initiating said updating means, and means responsive to the identity comparison means for resetting said delay upon a determination that the identities of the present speaker and the proposed new speaker are the same.

4. The improvement as set forth in claim 2 wherein said delay means includes means for setting the delay at about 3 milliseconds.

5. In a conference circuit for a digital telecommunications switching system having comparison means for comparing digital samples of conferees and producing an output signal identifying the largest sample in a frame, and means for identifying a present speaker and outputting his sample to the conferees during each frame, the improvement comprising, means for identifying a proposed new speaker having the largest sample during a frame, identity comparison means for comparing the identities of the present speaker and the proposed new speaker, means responsive to the identity comparison means for activating a delay means when said identities are different to initiate a delay, means responsive to the delay means for updating the identity of the present speaker to that of the proposed new speaker at the end of said delay, and means responsive to the identity comparison means for prematurely terminating said delay when said identity comparison means indicates that identities are the same, thereby to prevent updating of the present speaker.

6. In a pulse code modulated communication system having a plurality of communication channels, a switching network for switching signals from said channels, and a conference circuit connected to said switching network, said conference circuit comprising comparator means for comparing pulse code modulated samples of conferees and producing as a comparison result an output signal identifying the conferee with the largest sample, means for identifying a present speaker and outputting his sample to the conferees during each frame, the improvement comprising circuit means for opening a decision window following detection of a proposed new speaker having a sample larger than that of the present speaker, logic means operative during the decision window for monitoring the comparison results during said window to determine whether the proposed new speaker or the present speaker has the largest signal during said window, and means for updating the identity of the present speaker to that of the proposed new speaker if the logic means determines the proposed new speaker has the largest signal during the delay window.

7. A method of conferencing in a digital switching system of the type which switches digital samples representing sampled analog signals, the method comprising the steps of, outputting the digital sample of the present speaker to conferees during each frame, comparing the digital samples of the conferees to determine the largest sample in a frame, opening a decision window following detection of a proposed new speaker having a digital sample larger than that of the present speaker, monitoring the results of the comparison during the decision window to determine if the proposed new speaker or the present speaker has the largest overall signal during the decision window, and updating the identity of the present speaker to that of the proposed new speaker if the determination indicates the proposed new speaker has the largest overall signal during the decision window.

8. A method of conferencing in a digital switching system of the type which switches digital samples representing sampled analog signals, the method comprising the steps of outputting the sample of the present speaker to conferees during each frame, comparing the digital samples of the conferees to determine the largest sample in a frame, opening a decision window following detection of a proposed new speaker having a digital sample greater than that of the present speaker, determining if the signal of the proposed new speaker is greater than that of the present speaker during the decision window, and updating the identity of the present speaker to that of the proposed new speaker if said determination is positive.

* * * * *

UNITED STATES PATENT AND TRADEMARK OFFICE
CERTIFICATE OF CORRECTION

PATENT NO. : 4,267,593
DATED : May 12, 1981
INVENTOR(S) : John F. Regan and Bakulesh A. Mehta It is certified that error appears in the above—identified patent and that said Letters Patent is hereby corrected as shown below:

Col. 6, line 35, cancel "Q" and insert --$\bar{Q}$--, line 55, after "clock" insert --the--, line 56, cancel "Q" and insert --$\bar{Q}$--.

Col. 7, line 23, cancel "present" and insert --preset--.

Signed and Sealed this

Fourteenth Day of July 1981

[SEAL]

Attest:

GERALD J. MOSSINGHOFF

Attesting Officer

Commissioner of Patents and Trademarks